US011928819B2

United States Patent
Sieckmann et al.

(10) Patent No.: US 11,928,819 B2
(45) Date of Patent: Mar. 12, 2024

(54) METHOD, PROCESSING SYSTEM AND SYSTEM FOR APPROXIMATING IMAGE DATA

(71) Applicant: Leica Microsystems CMS GmbH, Wetzlar (DE)

(72) Inventors: Frank Sieckmann, Eppingen (DE); Frederik Nitschke, Walldorf (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 108 days.

(21) Appl. No.: 17/567,174

(22) Filed: Jan. 3, 2022

(65) Prior Publication Data

US 2022/0214533 A1 Jul. 7, 2022

(30) Foreign Application Priority Data

Jan. 5, 2021 (EP) .................................... 21150255

(51) Int. Cl.
*G06T 7/00* (2017.01)
*G02B 21/36* (2006.01)
(Continued)

(52) U.S. Cl.
CPC .......... *G06T 7/0014* (2013.01); *G02B 21/367* (2013.01); *G02B 21/368* (2013.01);
(Continued)

(58) Field of Classification Search
CPC ................ G02B 21/367; G02B 21/368; G02B 2027/0112; G02B 2027/0134;
(Continued)

(56) References Cited

U.S. PATENT DOCUMENTS

2002/0154798 A1* 10/2002 Cong ..................... G01N 15/14
 382/199
2009/0066784 A1* 3/2009 Stone ..................... G06T 7/536
 348/47

(Continued)

OTHER PUBLICATIONS

Benjamin Midtvedt et al.: "Quantitative Digital Microscopy with Deep Learning", arxiv.org, Cornell University Library, 201 Olin Library Cornell University Ithaca, Ny 14853, Oct. 16, 2020 (Oct. 16, 2020), XP081788277, pp. 1-25.

(Continued)

*Primary Examiner* — John R Schnurr
(74) *Attorney, Agent, or Firm* — Leydig, Voit & Mayer, Ltd.

(57) ABSTRACT

A method for approximating image data is disclosed. The method includes obtaining initial image data formed by imaging at least part of a sample and analysing the initial image data to form one or more portions of image data. The method also includes accessing a set of predefined stereotype elements, determining one or more of the stereotype elements as a visual approximation for the at least one object within the sample, selecting one or more of the determined stereotype elements to be associated with at least one object within the sample, and forming instruction data based on and/or including the one or more selected stereotype elements, the instruction data including instructions on how to arrange the one or more selected stereotype elements, to a processing system for approximating image data and to a system comprising such processing system.

25 Claims, 7 Drawing Sheets

(51) Int. Cl.
*G06N 3/08* (2023.01)
*G06T 7/11* (2017.01)
*G06T 7/20* (2017.01)
*G06T 7/33* (2017.01)

(52) U.S. Cl.
CPC ............... *G06N 3/08* (2013.01); *G06T 7/11* (2017.01); *G06T 7/20* (2013.01); *G06T 7/33* (2017.01); *G06T 2207/10056* (2013.01)

(58) Field of Classification Search
CPC .......... G02B 2027/014; G02B 27/0172; G02B 21/002; G06N 3/08; G06T 7/11; G06T 7/20; G06T 7/33; G06T 2207/10056; G06T 2207/20081; G06T 2207/20084; G06T 2207/30024; G06T 7/0014; G06V 10/82; G06V 20/698
See application file for complete search history.

(56) References Cited

U.S. PATENT DOCUMENTS

2019/0122027 A1* 4/2019 Prideaux-Ghee ....... G06T 7/248
2021/0352307 A1* 11/2021 Bae ........................ H04N 19/17
2023/0050857 A1* 2/2023 Allan ..................... G06V 20/20

OTHER PUBLICATIONS

Saga Helgadottir et al.: "Digital video microscopy enhanced by deep learning", arxiv.org, Cornell University Library, 201 Olin Library Cornell University Ithaca, NY 14853, Dec. 6, 2018 (Dec. 6, 2018), XP08099003, pp. 1-10.
Zinchuk, Vadim et al.: "Machine Learning for Analysis of Microscopy Images: A Practical Guide", Current Protocols in Cell Biology, vol. 86, No. 1, e101, Mar. 6, 2020 (Mar. 6, 2020), pp. 1-14, XP55811783, John Wiley & Sons, Inc., US.

* cited by examiner

US 11,928,819 B2

METHOD, PROCESSING SYSTEM AND SYSTEM FOR APPROXIMATING IMAGE DATA

CROSS REFERENCE TO RELATED APPLICATIONS

This application claims benefit to European Patent Application No. EP 21150255.4, filed on Jan. 5, 2021, which is hereby incorporated by reference herein.

FIELD

The present disclosure essentially relates to a method and a processing system for approximating image data with stereotype elements and a corresponding system including such processing system.

BACKGROUND

Modern microscopes allow viewing, imaging and analysing samples or objects in a very detailed manner. For example, a scanning microscope allows scanning the object layer by layer. Images typically also have to be processed. Such a process like image processing, for example, but also the actual process of image acquisition typically takes a long time, up to several or several dozens of minutes (typically depending on the complexity of the task and on the experiment itself; e.g., for very fast image acquisition high light intensities must be applied to achieve a sufficient exposure in a short time). This also results in that a user of the microscope who wants to view the object has to wait quite a long time until the scan is completed so he can view a (e.g., two- or three-dimensional) image of the object.

Thus, there are two aspects to consider when recording data. On the one hand, it is the aspect of recording or scanning itself, which can be very slow as it may require several layers to scan, each layer itself requiring some scanning time. On the other hand, it is the aspect of the user or viewer, who wants to see a result (e.g., the scanned cell) immediately and who does not want to wait dozens of minutes to see a single image and then wait another dozens of minutes to get an update. Thus, there is a seemingly insurmountable time gap between the aspect of slow recording and the aspect of the viewer's desired real-time perception. Such time gap would be of particular disadvantage if the user is about to experience a live-image or real-time view of the sample, using, e.g., a virtual realty headset providing 30 or even 60 frames per second. Thus, an object of the present disclosure is bridging such time gap and providing the user with a view before the imaging process has been finished.

SUMMARY

In an embodiment, the present disclosure provides a method for approximating image data comprising: obtaining initial image data formed by imaging at least part of a sample; analyzing the initial image data to form one or more portions of image data, each portion of image data representing at least part of an object within the sample; accessing a set of predefined stereotype elements; determining one or more of the stereotype elements as a visual approximation for the at least one object within the sample, which the at least one of the portions of image data is representing; selecting one or more of the determined stereotype elements to be associated with at least one object within the sample, which the at least one of the portions of image data is representing; and forming instruction data based on and/or including the one or more selected stereotype elements, the instruction data including instructions on how to arrange the one or more selected stereotype elements.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
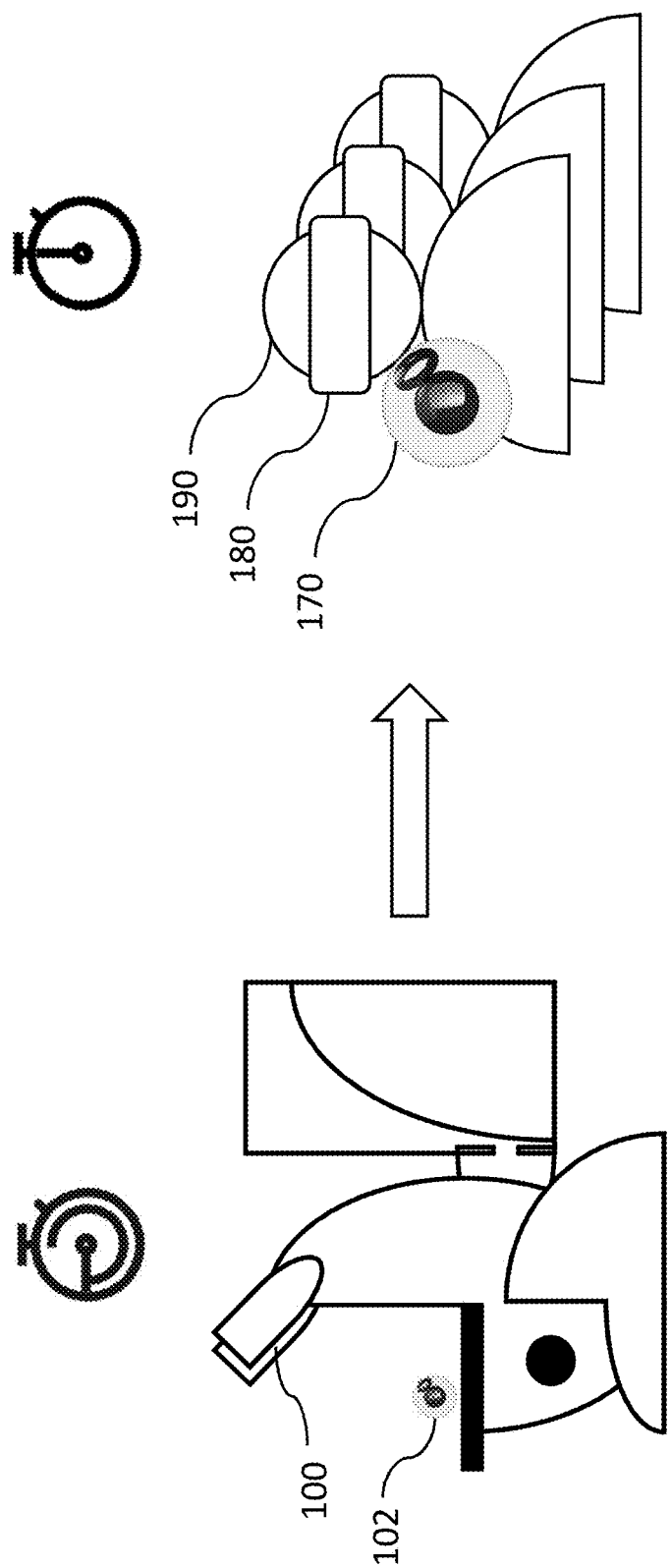
FIG. 1 shows, schematically, an illustration to explain the basic idea of an embodiment of the invention.

According to an embodiment of the invention, a method and a processing system for approximating image data and a system including such processing system with the features of the independent claims are proposed. Advantageous further developments form the subject matter of the dependent claims and of the subsequent description.

The invention relates to approximating image data with (or using) stereotype elements (e.g., multidimensional images, markers or abstract information such as measured values, proxy objects (dummies) or structures derived from the data such as chemical three-dimensional structures of molecules, and the like), which image data is formed by imaging at least part of a sample or object by, e.g., a microscope. It is to be noted that embodiments of the invention are described with respect to a sample imaged by an imaging system like a microscope; however, the basic idea also applies to any other kind of data or image data as will be apparent from the following description.

The method, as an aspect of the invention, comprises several steps. A first step is obtaining initial image data (or original image data) formed by imaging or recording a sample or at least part of such sample. It is to be noted that these initial image data may represent a full two- or three-dimensional image of the sample. However, these initial image data may also represent only parts of such an image, for example, part of a two-dimensional image or scan, several of which two-dimensional images or scans form a three-dimensional image. The initial image data might also be a snapshot of a temporal sequence of multi-dimensional images, the temporal sequence consisting of at least one image. As will also be apparent from the following, the images can include two-dimensional images, for example, in the form of a z-stack or three-dimensional. Images can also be a series of higher dimension, including, for example, several colour channels (e.g., eight colour channels) in three special dimensions. The effect of using initial image data representing only parts of an image will become apparent later. Said initial image data can be obtained from at least one of an imaging system or a data storage unit. This can be achieved, e.g., by means of a microscope, or a camera or image detector like an array or point detector or sensor, which might be part of such microscope. The microscope, in turn, can be at least one of a stereo microscope, a scanning microscope, a widefield microscope, a fluorescence microscope, a confocal microscope, a lightsheet microscope and an electron microscope (for example, several imaging/microscope types might be combined, also one after the other). However, any other imaging system configured for imaging a sample is suitable. For example, such initial image data can also be obtained within medical imaging like in magnetic resonance imaging (MRI).

A next step is analysing said initial image data to form (or identify) one or more portions of image data. Each of these portions of image data, which portions are formed from or identified in the initial image data, represents at least part of an object within the sample. If the sample, for example, is a cell, such objects might be cell nuclei. Accordingly, a portion of image data might correspond to a part of a two-dimensional image of a section through a nucleus. Further, a set of predefined stereotype elements is accessed (the set being provided, e.g., in a data base) and one or more of said stereotype elements are then determined (or identified) as a visual approximation of said at least one object within the sample. As mentioned before, the at least one of said portions of image data (i.e., at least part of the initial image data) represent these objects.

The set of predefined stereotype elements and/or the one or more of said stereotype elements that are determined (or identified) as the visual approximation can be chosen based on or taking into account metadata. Such metadata can include information about the sample that goes beyond the experiment setting, for example how old the sample is (e.g., a snake as the sample is 12 weeks old). Such metadata can also include or be based on inputs of a user, for example, the user can provide a specific style of the stereotype elements (e.g., realistic or stylized).

Further, one or more of said determined stereotype elements to be associated with at least one of said objects in the sample is selected. Such set of stereotype elements—which can also be called a set of (reference) objects or stereotypes—is a set or ensemble of different basic forms, which can be displayed on a suitable output means. Stereotypes can be multi-dimensional (n-dimensional) and may be vector graphics which can be controlled using their own object parameters.

Further, the method can comprise processing said initial image data before or within said step of analysing, wherein said processing comprises at least one of: filtering of said initial image data, geometric transformation of image data, deconvolution of image data. This allows improved and/or faster analysing and may also be part of an application of an artificial neural network Stereotype elements are not necessarily reference images (but they might be, in particular cases). Rather, reference objects or stereotypes can be abstractions of image content which approximate the image content or the object which is represented by the image content. Stereotype elements can be of any level of abstraction; a stereo type element can be, for example, a rectangle, a circle, a sphere, a box or also a symbol like a cross or a schematic representation, such as the schematic illustration of a molecular structure (e.g., of a protein complex). Such illustrations of different abstraction level can also be used as an overlay for a final image, as well be explained later. The dimension of a stereotype element can differ from the dimension of the original image and can have a higher dimension than the original image. Further examples for stereotype elements are a circle, having two dimensions, and a sphere, having three dimensions. A four dimensional reference object might be a time sphere, i.e., a sphere with a parameter (e.g., diameter) changing over time (time being the fourth dimension). A fifth or higher dimension could be a further parameter like the colour and/or texture of the surface of the sphere.

Such stereotype elements or sets thereof can be provided in a storage unit or database. Such a database can contain a variety of stereotype elements as data sets, each identified by a unique label. Each stereotype element in the database can be an object with controllable properties and methods (in the sense of a software object, in which properties and methods control the state of the object, this is, for example, the case for vector graphics as mentioned before) that are used to represent it in a virtual environment. While a general database of stereotype elements can include stereotype elements for a variety of applications, specific partial databases can include specific stereotype elements (being a subset of the stereotype elements in the (general) database) for a specific application like viewing or imaging a biological cell using a microscope.

Said analysing of initial image data includes at least one of the following (optionally automated) methods: image segmentation, image registration, structure from motion, machine learning methods (e.g., based on artificial intelligence, (deep) neural networks). In some embodiments, trained artificial neural networks are used. This allows efficient and quick analysing and recognizing of image content, particularly also of complex and noisy image content. In other words, the method also allows replacing a noisy image having content being hardly recognizable, by one or more wisely chosen stereotypes. Only relevant content that shall be recognized will be replaced by or associated with stereotypes but not any noise.

As mentioned before, one or more of said stereotype elements (in that set) are identified or determined as a visual approximation (or they are identified to be used for visual approximation) for said at least one object within the sample, the at least one of said portions of image data is representing; and, one or more of said determined stereotype elements are selected to be associated with at least one of said portions of image data. A visual approximation can be considered as visual appearance that does not in detail correspond to the actual object it approximates but which is similar. For example, a sphere may be considered as a visual approximation of a cell nucleus. Selecting said set of predefined stereotype elements is based on one or more characteristics of said initial image data or said portions thereof, and might also be influenced by metadata including, e.g., user input as mentioned before.

Said determining of said visual approximation and/or said selecting of one or more of said identified stereotype elements is performed at least in part by machine learning methods. In other words, a stereotype element that fits the portion of image data best is typically used for the visual approximation.

For example, if the portion of image data is or represents a circle or looks like a circle or is most likely a circle (this might be determined based on certain characteristics like shapes), then a circle can be selected as the stereotype. If it is known, however, that a cell including nuclei (as objects of the sample) is imaged as the sample and that the portion of image data is a circle, it might be considered likely that the circle, in fact, is a cross section of a sphere shaped nucleus of the cell. Then, a sphere can be selected as the stereotype (which has a higher dimension than the image); as mentioned before, such stereotype is a visual approximation of the nucleus. Depending on the type of cell (if known) also a certain colour of the sphere might be selected (or adjusted, using the object properties) for the stereotype.

Said determining of (said stereotypes of) said visual approximation can be based on (classical) image classification, which might be based on an accordingly defined feature space in order to determine or identify stereotypes fitting the objects with in the sample best.

Said determining of (said stereotypes of) said visual approximation comprises: checking whether a probability value, defining that a stereotype corresponds to a portion of image data, is within a predefined probability threshold, and, if no stereotype is found that fulfils that probability threshold, selecting a different set of stereotypes. Such probability value can be an output of an artificial neural network that receives the portions of image data and set of stereotypes as inputs. There might be several outputs, one output for one stereotype element. A typical output of such a neural network is that, for example, the probability that a certain stereotype corresponds to a portion of image data (which corresponds to an object in the sample, see above) is 80% (with the probability threshold being, e.g., 75%). Then, this stereotype can be selected. If the output is, for example, 50%, then there is a high chance that a wrong stereotype would finally be chosen. Besides, if no stereotype is found, the image data may also be re-analysed at a later point in time or be analysed continuously.

In a next step, instruction data is formed based on and/or including said one or more selected stereotype elements. This can be performed using a scene manager, as will be explained below. The instruction data includes instructions on how to arrange (or combine) the selected stereotypes, for example, in a scene or the like. Such scene can later be visualized (as an image) for the user, as will be described later. Such forming of instruction data can, in other words, be described as providing instructions for combining the selected stereotype elements (optionally also considering their relative positions to each other and the like), for example, using the scene manager. This results in a scene or kind of a scene in which the stereotype elements are placed in such relation to each other and orientation and the like as the objects in the sample do. In the example mentioned before, the sample being imaged includes a cell or nucleus, but due to scanning the image in layers, only one layer—including a shape in the form of a circle—of the real image is acquired as image data at the beginning. However, the instruction data (which can be used to visualize an image for the user) already can allow visualizing the overall (e.g., three-dimensional) shape of the cell or nucleus. This means that even if only two-dimensional image information is available, stereotypes of higher dimension (three-dimensional or n-dimensional, when including time, colour, structures, etc.) can be obtained within an embodiment of the present invention.

Said forming of instruction data is performed using a scene manager as mentioned above. The scene manage may be used to and/or is configured to determine the instructions how to arrange said one or more selected stereotype elements (which instructions are then part of the instruction data). For example, all stereotype elements recognized at a certain point in time of the analysis are arranged in a multi-dimensional scene by such scene manager in such a way that this scene comes as close as possible to a meaningful, three-dimensional arrangement of the current state of knowledge (analysis state) of the captured or acquired (image) data. A scene is therefore a snapshot in a script that the scene manager automatically creates based on the currently captured or known data. As soon as the data collection provides further data, the stereotype elements may be updated and supplemented and then converted into a new scene by the scene manager, so to speak the next act in a fully automatically generated screenplay. From such continuously changed and adapted arrangement of these stereotype elements, as compiled and updated by the scene manager, the possibility of viewing in the virtual world by entering this world as a "player" (e.g., via 3D glasses) arises.

To sum up, such scene manager provides or arranges all information related to the stereotype elements necessary to create the scene and puts this information into the instruction data; such information can include the relation of the stereotype elements to each other (as mentioned before); the information (and, thus, also the instructions) can also include, data relevant for illustration (colour, size, illumination, transparency, temporal changes, textures and the like). Such scene manager can, thus, be compared to a (stage) director for a movie. The scene manager can be based on a template, i.e., a data set that includes certain parameters relating to rendering of the stereotype elements (i.e., the scene) and the like.

In a further step, said instruction data can be transmitted. In this way, the instruction data can be transmitted to, e.g., a visual display unit suitable for displaying one of a two-dimensional view, a three-dimensional view, a sequence of multiple two-dimensional or three-dimensional views, in which a visualization or image is generated for the user, based on said instruction data. Such visual display unit may be one of: a virtual reality headset or device, a two-dimensional display (like a computer display, a smartphone or tablet display, or an ink paper display), a three-dimensional display (i.e., a display configured to provide a three-dimensional view to a user), a device including shutter glasses, beamer or three-dimensional monitors. Also, an augmented reality headset or device can be considered.

Thus, said instruction data comprises data suitable to generate an image be displayed as at least one of a two-dimensional view, a three-dimensional view, a temporal sequence of multiple two-dimensional or three-dimensional view. As will further be described below, in an embodiment of the invention, the stereotype elements that may occur in a scene are transferred to the target system (e.g., 3D headset) via download and, thus, are already available there. The scene manager can give instructions which stereotype elements must be arranged how and where in the virtual three-dimensional space. In addition, the scene manager can specify the interaction behaviour (e.g., the user touches a stereotype in virtual reality or specifying how the use can interact with this stereotype). Object properties of such interaction can be specified in order to achieve that.

Said instruction data can include at least one of the following parameters for at least one selected stereotype element: an identifier, a position, a size, an orientation, and a modifier for the stereotype element. It also can include said at least one selected stereotype element. In this way, no huge amount of (approximated) image data need to be transmitted but only information allowing (exactly) generating or constructing such image, based on the selected stereotype elements. For construction of such image—it may be considered as an approximated image of the sample that is actually imaged—at a remote place, the database of stereotype elements mentioned before can be used; it can be advantageous to copy this database of stereotype elements to be used to the display device beforehand, in order to achieve a higher reaction speed.

For example, if the instruction data is based on a certain stereotype element like a blue sphere with a certain diameter, it can be sufficient that the instruction data to be transmitted includes an identifier that allows (exactly) identifying that blue sphere with that certain diameter in or from a database or the like. In a simple case, such identifier might be a number or a tuple of numbers exactly identifying the blue sphere with that certain diameter in the database of stereotype elements. For example, the database might include blank stereotype elements with properties (colour, size, structure and the like) which can be referred to with or by the instruction data; this allows combining the stereotype elements with selected properties in a scene. This reduces the amount of data or information that has to be transmitted.

The method further comprises forming improved instruction data, having an increased (or changed) level of detail compared to said (former) instruction data. The increased level of detail refers to the visualization or image to be generated from the instruction data. Such step can take place after having formed said instruction data and before transmitting it, such that the improved instruction data will be transmitted. Also, this step can take place after the instruction data having been transmitted, thus, providing or replacing the instruction data at the (remote) destination (where it is transmitted to). These steps can be repeated. In this way, the instruction data, which may be continuously created and updated by the scene manager, will be improved after every iteration. Accordingly, the visualization or image to be generated from the instruction data—and which the user will see or experience—will also be improved.

Said instruction data is formed by including at least an additional part of said initial image data. This might be the case if only part of the initial image data available was used to create the instruction data in a first step. Another way to form improved instruction data is by changing one or more parameter values used in said identifying of a visual approximation. This might be the case if the image (or visualization) generated from the (prior) instruction data is considered not good enough.

Another way to form improved instruction data is by obtaining additional initial image data. Obtaining additional initial image data can include, for example, scanning a further layer of the sample or completing a layer having been scanned only in part, so far. This allows the analysis of the stereotype elements to be selected and their properties (e.g. size, position, colour, and the like) to be performed continuously during the acquisition of the image data. In this way, e.g., the neural network can continuously correct or improve the instruction data (as mentioned before, the instruction data can be used to create a scene) by iteratively re-evaluating the old and new data generated during a scan and, based on the solutions found for the moment, adapting, discarding or adding new stereotype elements.

Within the example mentioned before, such additional initial image data can include a further circle or a shape looking like that, however, with different diameter than the one obtained in the first layer; this indicates (with higher likelihood than before) that the real object in the sample being imaged has the shape of a sphere. Thus, the improved instruction data can include or being based on a sphere with specific diameter.

In addition, it is possible to include, in the instruction data, a dummy object to be generated. For example, the initial image data includes a shape that cannot yet be identified within the analysing step (but which nevertheless contains clear characteristics of an object, e.g., by standing out from the noise, by exceeding a certain size or the like) and, thus, cannot (yet) be associated with a proper stereotype element. Then, a dummy object or stereotype can be chosen. This allows to include a dummy object (e.g., a sphere of certain colour) in the image to be presented to the user (and which is generated from the instruction data) in order to indicate to the user that there is any object present in the sample being imaged, however, the actual type or shape of object is not—or not yet—known.

It is to be noted that the steps of the method mentioned before can—similar to the way of getting improved instruction data—be repeated, including obtaining more and more initial image data. This corresponds to, for example, scanning one layer of the object after the other. In this way, the image to be generated from the instruction data will get closer and closer to the real object being imaged.

As a consequence, a user at the remote place (note that such remote place also might be near to the microscope), for example, will be experiencing the image generated form the instruction data being transmitted—and thus the representation of the object or microscopy sample being viewed—becoming better and better, e.g., having more details after every iteration. This might be within a virtual reality as if it would be real time even though the microscopy experiment or image acquisition requires more time to be generated. Also a two-dimensional display or monitor used to display the image generated from the instruction data allows such experience. This allows overcoming the time delay in imaging the object (e.g., with scanning layer by layer) and the user will be seeing an (approximated) image of the object (becoming better and better) from the very beginning.

It is to be noted that the (approximated) image of the object the user is seeing (or provided with) does not necessarily have to become more detailed over time. Depending on the situation, it might not be desired and/or not necessary that the image represented according to an embodiment of the invention (the virtual scene or image) becomes more and more "naturalistic" and finally "converges" to the final image in the course of the scan of the sample. Rather, the final image might remain with consciously symbolic stereotypes or stereotype elements, which, for example, reflect the structures of the samples recognized at an abstract level. For example, in a microscopic image for a suspected or then finally definitely identified cell membrane, corresponding lines and/or bands could simply be drawn in or even the corresponding membrane proteins can directly be provided in a symbolic representation. These simplified (possibly three-dimensional) representations or stereotype elements can then also be superimposed on the actual (possibly two-dimensional) microscopy image, as it is, and/or also on the final image (as an overlay, as mentioned above). This then corresponds to a form of augmented reality.

It should be noted that with such a representation there is no limitation to the physical resolution limit and/or other physical and/or technical restrictions of the image recording method used. If information and/or metadata obtained through other methods is already available (e.g. chemical structures), such information can—and should—flow into the selection and presentation of the stereotype elements. For example, a confocal microscope is used, but X-ray structure analysis reveals certain protein structures that cannot be resolved by confocal microscopy. In such a case, these proteins, where suspected in the confocal microscope image, can of course be displayed directly in symbolic form scaled to an unrealistic size and adjusted in their number.

Additionally, automatic text or symbol-based displays such as help texts, annotations, frames, arrows, and the like are also easily conceivable. Depending on the field of application or the target (sample) of the imaging (recording), the actual image may not be relevant at all for the viewer or user, but only its interpretation. This complies with the inventive approach using stereotype elements: the invention allows generating a possibly user-relevant representation much faster than with a conventional image recording (in which the image is slowly built up or it is necessary to wait until all image data are available). Any supposed disadvantage of an "undetailed" representation using stereotypes can, thus, be turned into the opposite.

The method applies to both, the initial image acquisition by, e.g., the microscope and to changes of the parameters of the microscope or the image acquisition by, e.g., the user in the virtual environment during runtime. In other words, when a user is provided with a very detailed image of the sample being viewed (after a full scan of the object) and he changes parameters of the microscope (e.g., scanning another portion of the sample or using other light or the like), the steps can start again from their beginning. The scanning by the microscope continues and the estimated virtual objects will continuously be adapted to the real data from the microscope until the data acquisition by the microscope will be completed. The virtual environment is constantly changing, but it creates a feeling of real time right from the beginning.

Embodiments of the invention also relate to a processing system comprising one or more processors configured for performing a method according to the invention. The processing system further comprises a first interface configured for connecting to a visual display unit, and/or a second interface configured for connecting to a storage unit which comprises said set of predefined stereotype elements, and/or a third interface configured for obtaining said initial imaging data. Such processing system may also be configured to infer AI models or neural networks as will be described later.

Embodiments of the invention also relates to a system, comprising a processing system according to the invention, and a visual display unit suitable for displaying one of a two-dimensional view, a three-dimensional view, and a sequence of multiple two-dimensional or three-dimensional views, of an image based on or generated from said instruction data. Said visual display unit is one of: a virtual reality headset, a two-dimensional display, a three-dimensional display, a device including shutter glasses, a projector, a three-dimensional monitor, an augmented reality device, a laser projector, a projector, a holographic imaging/displaying system, mixed reality smart glasses, a display system including lenticular plates, a three-dimensional printer, a stereo display (anaglyphic ones, based on polarization, based on shutter displays), three-dimensional volume displays, spherical displays, chroma depth method based displays. The system may further comprise an imaging system configured for imaging said sample. Said imaging system can include a microscope, for example a stereo microscope, a scanning microscope, a widefield microscope, a fluorescence microscope, a confocal microscope, a lightsheet microscope, or an electron microscope. Also combinations thereof are possible.

With respect to further details and advantages of the image processing unit and the system, it is also referred to the remarks for the method above, which apply here correspondingly.

The invention also relates to a computer program with a program code for performing a method according to the invention when the computer program is run on one or more processors and/or on one or more image processing units according to the invention.

Further advantages and embodiments of the invention will become apparent from the description and the appended figures.

It should be noted that the previously mentioned features and the features to be further described in the following are usable not only in the respectively indicated combination, but also in further combinations or taken alone, without departing from the scope of the present invention.

In FIG. 1, a microscope 100 used for imaging a sample 102 is shown on the left side. Such imaging typically takes a several minutes or dozens of minutes if imaging includes performing a three-dimensional scan having several layers. This is illustrated with a stopwatch above the microscope 100. A user 190 of the microscope 100—or a user that is about to examine the sample 102—has, thus, to wait a long time until the three-dimensional (or higher dimensional) image is provided.

Such time gap will be prevented or overcome within embodiments of the present invention in that a virtual view or a virtual image 170 of the sample 102 is provided from the very beginning of the imaging process performed by the microscope 100. Such virtual image 170 is based on an analysis of a subset of the scanned data (initial image data) of sample 102 and is, thus, an estimate of the likely type, its location, size, colour, and the like of sample 102; it can be provided to the user 190, for example, by means of a visual display unit 180 like virtual reality (VR) glasses or a virtual reality headset. Also, such virtual image 170 might be provided to further users on their respective visual display units. Such further uses do not need to be in the same room as first user but they might be located anywhere in the world, being connected over, e.g., internet.

Figure 2:
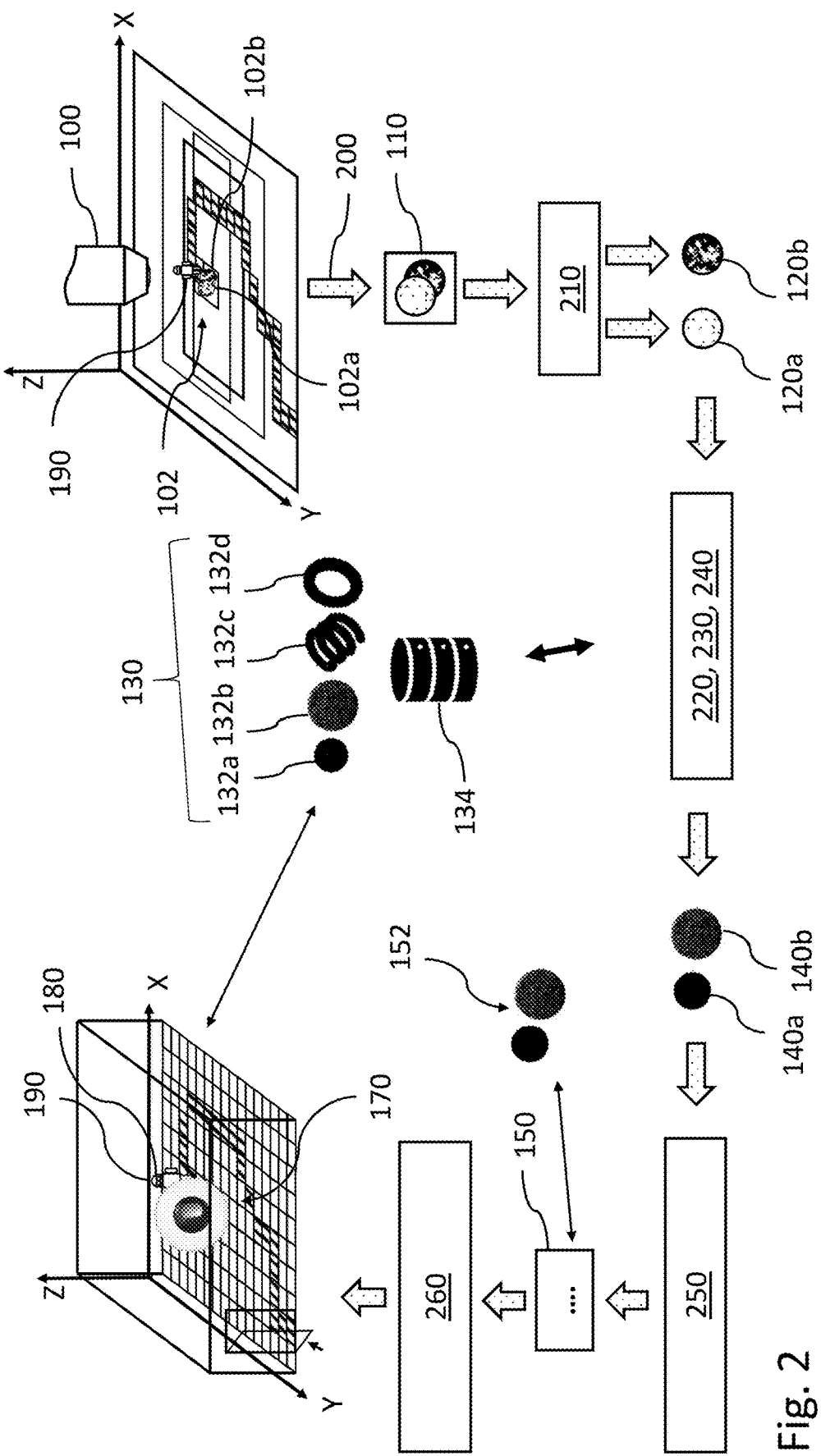
FIG. 2 shows, schematically, a method according to an embodiment of the invention.

In FIG. 2, a method according to an embodiment of the invention is schematically shown. A sample 102 is imaged by means of a microscope 100 (only part thereof is shown), as is also shown in FIG. 1. As is illustrated in FIG. 2, the sample 102 is three-dimensional with dimensions X, Y and Z. By means of example, the sample 102 includes two objects 102a, 102b like cells. In this way, initial image data 110 is formed and can be obtained in a step 200 by, e.g., an image processing unit (please see further Figs. for more details in this regard). The initial image data 110 can be a scan of a layer of the sample 102. In the example shown, the initial image data is a two-dimensional image (e.g., in dimensions X and Y) including two overlapping circles which might be cross sections of two cells.

In a step 210 (it is kind of a pre-analysis), the initial image data 110 is analysed to form portions 120a, 120b of image data. These portions 120a, 120b represent or correspond to the objects 102a, 102b within the sample 102. Such analysing can be performed by means of machine learning, using artificial intelligence. However, also conventional image analysation methods like segmentation might be used. In the shown example, the two circles are identified as the portions. Such analysis can also include identifying the positions (e.g., X-, Y- and Z-positions) of the portions relative to each other and/or in absolute manner within the initial image data.

In a step 220, a set 130 of predefined stereotype elements 132a, 132b, 132c, 132d is accessed. As mentioned before, such stereotype elements are different, multi-dimensional basic forms (e.g., vector graphics), which can be displayed on a suitable output means. The stereotype elements also might be of certain colour and/or have textures. The set 130 can be provided in a database or specific partial database 134, which can, for example, be part of a cloud computing system (please see further Figs. for more details in this regard).

Step 210 can be a pre-analysis component or step that can use classical image analysis, machine learning, AI or any combination thereof to select suitable stereotype elements for the subsequent analysis, which uses artificial intelligence, deep learning, AI, machine learning. Step 220 can be or include the AI or machine learning component or step (or be part of such step) choosing the stereotype elements. Thus, step 220 can also be an analysis step or part thereof.

Next, in a step 230, one or more of said stereotype elements (as mentioned before, these might be vector graphics) are determined (or identified) as a visual approximation for the portions 120a, 120b of image data or the objects 102a, 102b they are representing, respectively. Then, in a step 240, stereotype elements 140a, 140b, out of the determined stereotype elements, are selected and associated with the portions 120a, 120b of image data and, thus, also with the objects 102a, 102b they are representing. Determining or identifying the (best) stereotype elements can be based on machine learning methods and/or image analysis. This can include analysing which stereotype elements with which dimensions will approximate the segmented and relevant portions 120a, 120b or the objects they represent best.

As mentioned before, machine learning methods or artificial intelligence—typically one or more (trained) artificial neural networks—can be used. Such artificial neural networks can be used in one, more or all of steps 210, 220, 230 and 240. For example, the initial image data 110 is analysed in step 210 by including a pre-analysis, preparing the initial image data for the subsequent application of the neural network and reducing artefacts (segmenting, de-noising and the like). The neural network then provides as outputs or output vectors a list of all (possibly) relevant stereotype elements (see step 230). Those stereotype elements of such list with the highest probability (the probability that a stereotype element corresponds to the object which is included in the sample) are selected (see step 240).

In a next step 250, instruction data 150 is determined or formed, based on and/or including the selected reference objects 140a, 140b, and which include instructions on how to arrange or combine these selected stereotype elements 140a, 140b. In this way, the instruction data 150 allows building or forming a scene 152 in which the selected stereotype elements 140a, 140b are arranged at specific positions and have specific parameters (like dimensions, colour and the like) such that their positions relative to each other and/or in absolute manner and/or orientation in the space correspond to the corresponding positions and orientations of the nuclei or objects 102a, 102b in the sample 102 (but without any noise obtained during imaging). It is to be noted that such three-dimensional scene 152 (or n-dimensional, including colours etc.) is generated from the very beginning, having only imaged, for example, part of a first two-dimensional layer of the sample.

The instruction data 150 can then be transmitted, in a step 260, to visual display unit 180 like virtual reality (VR) glasses or a virtual reality headset, such that a user 190 (who is wearing such glasses or otherwise looking at such display unit) can experience a virtual representation or virtual image 170 of the imaged sample.

One way is to transmit the instruction data 150, such instruction data including, for example, parameters for the selected stereotype elements 140a, 140b like identifiers, positions, sizes, and orientations. For example, such identifier is used to exactly identify the relevant stereotype element within the overall set 130. The positions, for example, can be used to generate the positions of the two selected reference objects relative to each other and/or in absolute manner.

In this way, the instruction data 150 can be used to generate the virtual image 170 by means of the visual display unit 180 and, thus, the user can view the sample in virtual reality. In other words, the scene 152 is visualized by means of the visual display unit 180. Such visualization might include accessing the database including the set 130, by the visual display unit 180, in order to obtain information about the stereotype elements, based on the identifiers that identify the selected stereotype elements. Data that has to be transmitted from the mentioned image processing unit to the visual display unit can be of very low amount. One way is to provide the set 130 (in addition) on the visual display unit 180 (or a memory unit of it). Then, data transfer to the visual display unit 180 can further be decreased and the speed of generating the virtual image 170 can be improved. This can be of particular relevance when new instruction data is transmitted to the visual display unit 180 in order to improve the level of detail of the virtual image 170 (and the corresponding scene 152). The set 130 can, for example, be received at the visual display unit 180 at an initialization step or with the first set of instruction data.

These steps can be repeated for every further layer scanned by the microscope 100. In this way, the virtual image 170 the user is viewing or experiencing will become better and better over time (during scanning of the microscope), while an approximated virtual image with low details can be provided from the very beginning. As mentioned before, also further users, being located anywhere, can also be provided with the virtual image. Further, image data obtained (at the same or at different times) by two or more microscopes (or any other image sources) can be used as or be combined in the initial image data. This allows even better and more detailed views. For a further detailed explanation of that development of the virtual image, it is referred to the following Figs.

Figure 3A:
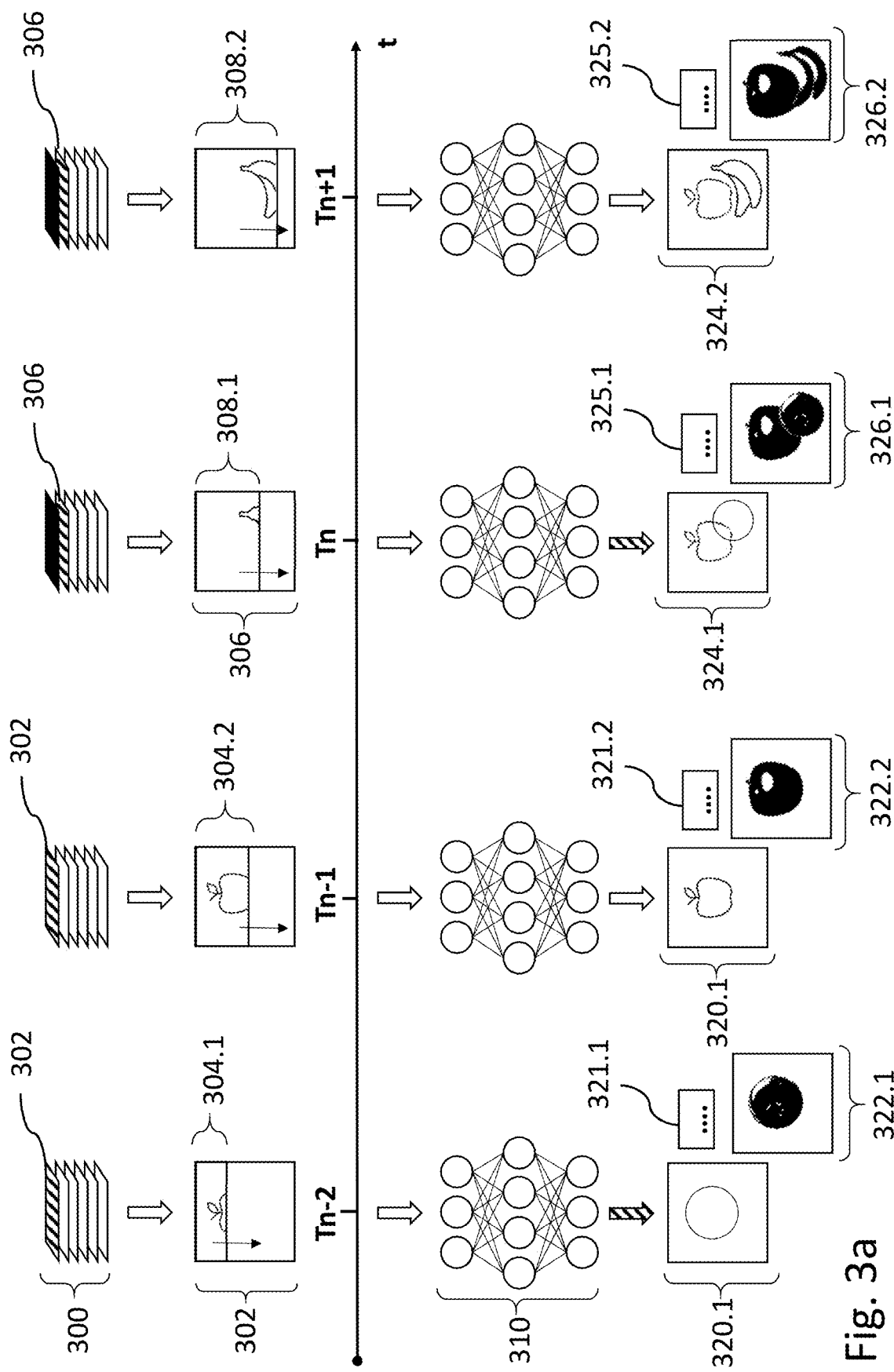
FIG. 3a shows, schematically, a method according to an embodiment of the invention.

In FIG. 3a, a method according to an embodiment of the invention is schematically shown. The evolvement of the virtual image based on the initial image data becoming more and more over time (horizontally in the Fig., from the left to the right, indicated as time t) will be explained. In horizontal direction, four different phases Tn−2, Tn−1, Tn and Tn+1 of scanning a sample (as basically explained in FIG. 2) are shown. In vertical direction, different steps within each phase (and which at least in part and basically correspond to the method described with respect to FIG. 2) are shown.

On the upper left, a stack 300 of several two-dimensional images to be acquired from a sample is shown. This might correspond to scanning a sample by means of a scanning microscope layer by layer, wherein each layer being scanned results in one of these two-dimensional images. In the present case, a first layer is scanned, i.e., a first (two-dimensional) image 302 is acquired. At the stage shown for the first phase at Tn−2, the first image 302 is acquired less than half of it. Portion 304.1, showing the upper part of an apple by means of example, which has be acquired so far, basically corresponds—at this stage—to initial image data 110 as shown in FIG. 2.

This portion 304.1 is analysed by means of a neuronal network 310, which might be a convolutional neural network (CNN), in order to identify what content or object the portion 304.1 might represent or what the entire image 302 might show. In the first phase shown, the analysing results in that the content or object actually present could not be determined. Thus, a stereotype element acting as a placeholder is chosen. By means of example, a stereotype element that might be a circle in two dimensions or a sphere in three dimension (it also might include a colour as a further dimension) is shown, represented with image 320.1 for the two-dimensional circle and with image 322.1 for the sphere. This step basically corresponds to step 230 shown in FIG. 2

Instead of a CNN, a recurrent neural network (RNN), i.e., kind of network with feedback and memory can be used. In some embodiments, LSTM (Long Short Term Memory) approaches in RNNs are a good approach.

Further, instruction data 321.1 is formed that allows generating or building a scene or virtual image from or with the chosen stereotype element. Basically, image 322.1 can also be considered showing such scene or virtual image. This process basically corresponds to steps 220, 230, 240 and 250 shown in FIG. 1. These instruction data 321.1 can then be transmitted to a visual display unit as described with respect to FIG. 2. Thus, a user will see a virtual sphere.

In the second phase shown in FIG. 2, at Tn−1, the first layer is further scanned (in the example shown, by more than half) and the first image 302 is almost completely obtained. Portion 304.2, showing almost all of the apple, which has be acquired so far, corresponds—also at this stage—to initial image data 110 shown in FIG. 2.

Again, portion 304.2 is analysed and, now, the content of image 302 can be determined as being an apple. Thus, another stereotype element—one that is or represents an (red) apple—can be chosen instead of the placeholder one before. Corresponding two-dimensional image 320.2 now shows a two-dimensional apple and corresponding three-dimensional image 322.2 now shows a three-dimensional apple. Further, improved instruction data 321.2 is formed and transmitted to the visual display unit. Thus, the user will see a virtual (red) apple, the sphere, however, will vanish. Also, it might be that the sphere changes or transforms into the apple.

It is to be noted that imaging or scanning of the sample is a continuous process, resulting in the initial image data becoming more and more. Also, analysing the initial image data and determining the object in it and selecting an appropriate stereotype element can be a continuous process. In other words, a neural network is trying to recognize the content of the initial image data while being fed with more and more information.

In the third phase shown in FIG. 2, at Tn, the second layer is scanned more and the second image 306 is obtained in part. Portion 308.1, showing the upper part of a banana, which has be acquired so far, corresponds, together with image 302, to initial image data 110 shown in FIG. 2.

Portion 308.1 is analysed in order to identify what content or object the portion 308.1 might represent or what the entire image 306 might show. In the third phase shown, the analysing results that the content or object actually present could not be determined. Thus, a stereotype element acting as a placeholder is chosen. By means of example, a stereotype element that might be a circle in two dimensions or a sphere in three dimension (it also might include a colour as a further dimension) is shown, represented with image 324.1 for the two-dimensional circle and with image 324.1 for the sphere Note that, depending on the situation, portion 304.2 or the entire image 302 might and typically will also be included in the analysation. Since the apple is still present in the sample, the apple is also present in images 324.1 and 324.2. Further, instruction data 325.1 is formed and transmitted to the visual display unit. Thus, the user will see the virtual (red) apple and, in addition, a sphere.

In the fourth phase shown in FIG. 2, at Tn+1, the second layer is scanned, by means of example, almost completely and, thus, the second image 306 is almost completely obtained. Portion 308.2, showing almost all of two bananas, is again analysed and, now, the content of image 306 or the object it represents can be determined as being two bananas. Thus, another stereotype element (or several ones)—one that is or represents two (yellow) bananas—can be chosen instead of the placeholder one before. Corresponding two-dimensional image 324.2 now shows a two-dimensional apple and two two-dimensional bananas and corresponding three-dimensional image 326.2 now shows a three-dimensional apple and two three-dimensional bananas.

Further, improved instruction data 325.2 is formed and transmitted (to the visual display unit. Thus, the user will see the virtual (red) apple and, in addition, two (yellow) bananas, the sphere (used as dummy or placeholder as long as the bananas could not be recognized yet), however, will vanish. Also, it might be that the sphere changes or transforms into the two bananas, while the apple remains present.

This example shows how a virtual image of the sample being imaged or scanned by means of the microscope evolves during the scanning procedure. Unlike in conventional manner, however, the user will be provided with a virtual image from the (very) beginning of the scanning procedure. This means that even with a very low velocity of scanning, an approximately coherent 3D preview will be created after a short time, which can, for example, display at 30 or even 60 fps in, e.g., the virtual reality headset A further aspect of that method is that, while the images acquired by the microscope typically include noise or are noisy, the virtual image does not have any noise. This is because during analysing the image, only relevant objects are identified, any irrelevant things or objects like the noise, however, can (automatically) be neglected.

Figure 3B:
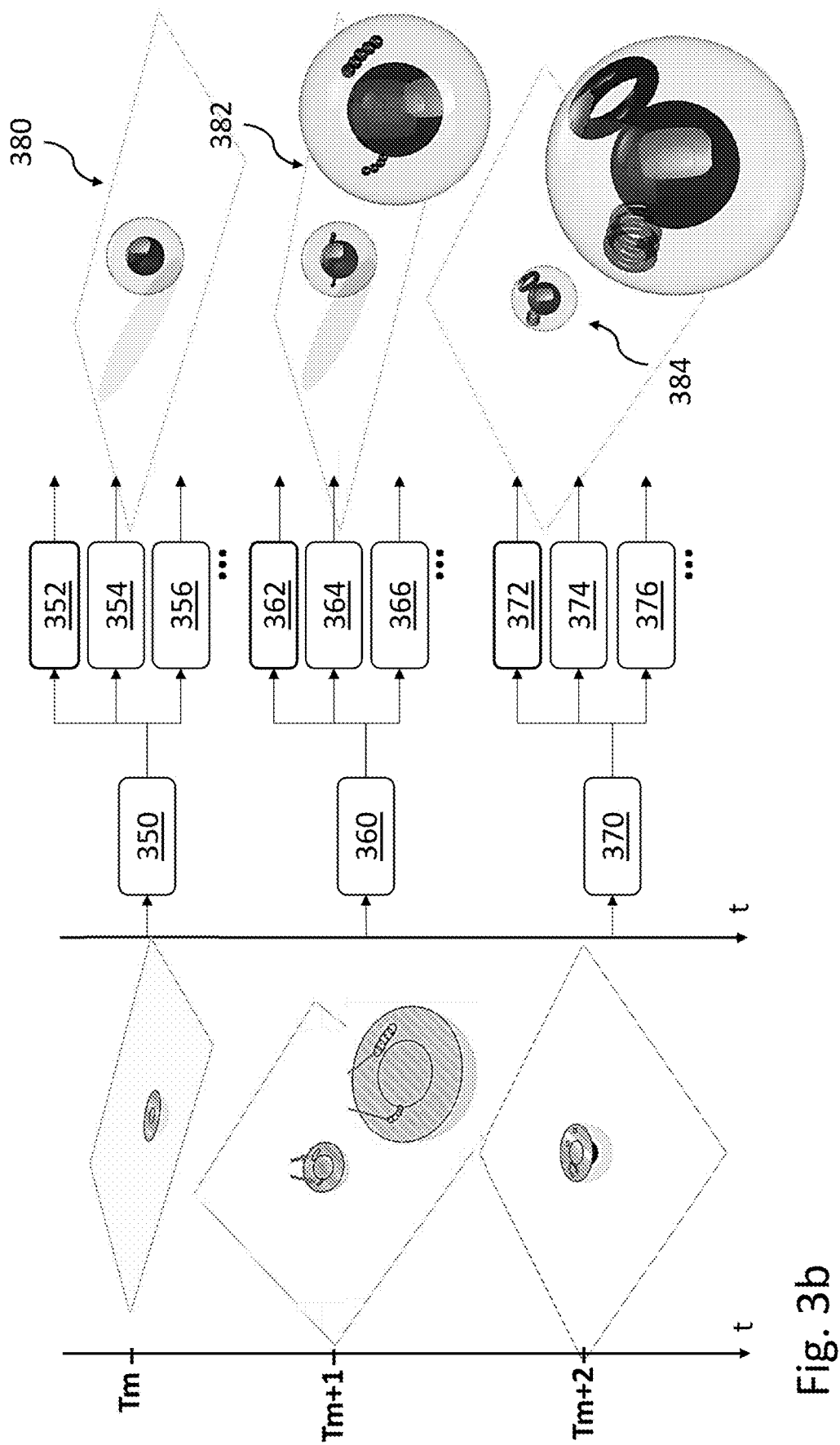
FIG. 3b shows, schematically, a method according to an embodiment of the invention

In FIG. 3*b*, a method according to an embodiment of the is schematically shown. Similar as in FIG. 3*a*, the evolvement of the virtual image based on the initial image data becoming more and more over time (vertically in the Fig., from the top to the down, indicated as time t) will be explained. In vertical direction, three different phases Tm, Tm+1 and Tm+2 of scanning a sample (as basically explained in FIG. 2) are shown. In horizontal direction, different steps within each phase are shown. The currently scanned layers of the sample are indicated with 340, 342 and 344 for the respective phases.

In the first phase, at Tm, a first layer 340 or two-dimensional image of the sample is obtained and corresponds to the initial image data. In step 350, two-dimensional deep learning (using an artificial neural network) is performed. This might have different outputs, indicated with 352, 354 and 356. Output 352 is that no object has been recognized. This would result in using a dummy or placeholder stereotype element as mentioned with respect to FIG. 3*a*. Output 354 is that the object represented by the image data in layer 340 is a cell nucleus and Output 356 is that the object represented by the image data in layer 340 is a cell membrane. Each output can further include, for example, positions in X-, Y- and Z-direction and a colour and the like. There could be more possible outputs, of course, typically being based on the set of stereotype elements that is available.

The outputs obtained from step 350 are then used to form instruction data, which allow generating a scene or virtual image for the user. In the first phase, the output shall be 352, i.e., no object has been recognized (but the position of the object) and, thus, the scene denoted 380 is made of a sphere in a cell.

In the second phase, at Tm+1, a second layer 342 or two-dimensional image of the sample is obtained and corresponds—together with data from layer 340—to the initial image data. In step 360, two- and/or three-dimensional deep learning (using an artificial neural network) is performed. This might have different outputs, indicated with 362, 364 and 366. These outputs can correspond to outputs 352, 354 and 356.

The outputs obtained from step 360 are then used to form improved instruction data, which allow generating a scene or virtual image for the user. In the second phase, the output shall be 364, i.e., a cell nucleus has been recognized. A further output might be 362, i.e. the further objects in the sample (see arrows in layer 342 and its enlarged view) have not been recognized. Thus, the scene denoted 382 (small and enlarged view) is made of a cell nucleus in a cell and some dummy spheres.

In the third phase, at Tm+2, a third layer 344 or two-dimensional image of the sample is obtained and corresponds—together with data from layers 340 and 342—to the initial image data. In step 370, two- and/or three-dimensional deep learning (using an artificial neural network) is performed. This might have different outputs, indicated with 372, 374 and 376. These outputs can correspond to outputs 352, 354 and 356.

The outputs obtained from step 370 are then used to form improved instruction data, which allow generating a scene or virtual image for the user. In the third phase, the output shall be 376, i.e., a cell nucleus has been recognized. A further output might be 376, i.e. the further objects in the sample have now been identified as specific cell membranes or the like. Thus, the scene denoted 384 (small and enlarged view) is made of a cell nucleus in a cell and some cell membranes (or other cell components). This also shows that a user is provided with a virtual image of the sample being imaged or scanned from the (very) beginning of the scanning procedure.

Figure 4:
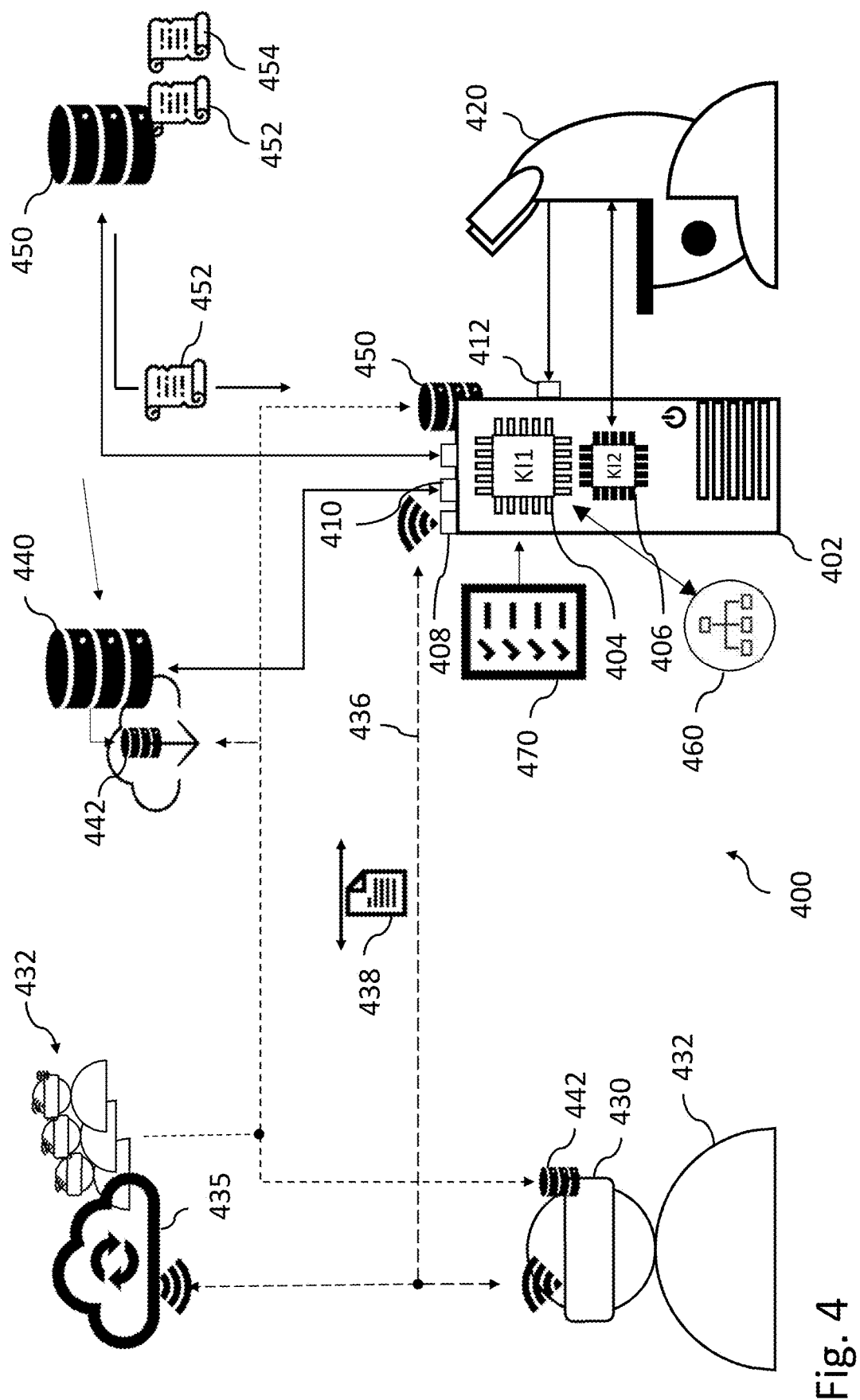
FIG. 4 shows, schematically, a system according to the invention in an embodiment.

In FIG. 4, a system 400 according to an embodiment of the is schematically shown. The system 400 comprises a processing system 402, an imaging system 420 in form of or including a microscope, a visual display unit 430 in the form of a virtual reality (VR) headset, which is assigned to a user 432, a scene manager 460, and a (digital) lab-book 470. Further, a storage unit 440 in the form of a database for storing sets of reference objects, and a storage unit or database 450 for storing artificial intelligence (AI) models are provided and which may be accessed storage units 440 and 450 may or may not be considered part of the system 400.

The processing system 402 comprises, by means of example, two AI-units 404 and 406 configured to perform certain machine learning or AI methods as described within embodiments of the invention. Processing system 402 or AI-unit 404 is used for performing a method according to some embodiments of the invention, for example, as explained with respect to FIGS. 1 and 2. AI-unit 406 might be used for controlling the imaging system or microscope 420. Processing system 402 is also configured to infer AI models or neural networks as will be described later The processing system 402 is the actual control system within system 400, which obtains, records and interprets the images and puts them into scene (i.e., creates instruction data for creation of a scene or virtual image). Processing system 402 can be a separate PC, an embedded system, a SOC or the like. Processing system 402 or AI-unit 404 should be capable of inference, such that one or multiple specific artificial intelligence (AI) models 452 can be present, after having been loaded from database 450, which provides different AI models, e.g., 452, 454. The chosen AI model can then be used for performing a method according to some embodiments of the invention. Note that such AI model (in the sense of machine learning model and similar) was already addressed before.

The processing system 402, which may use the AI model, is specialized in generation of scenes based on the mentioned stereotype elements, such that incoming images are analysed, objects contained therein are classified, their position, size and location are determined, and, by means of the scene manager 460, can create a virtual image (or virtual scene) made up of or based on the instruction data. It shall further be able to deal with different kinds of stereotype elements, e.g. with 2D and/or 3D and/or nD (n- or multi-dimensional) stereotype elements. It shall also be able to control the scene manager by means of control signals transmitted to the virtual display units. For a more detailed explanation of the steps or abilities of the processing system 402, in particular using the AI model, it is referred to the remarks above.

The processing system 402 further comprises a first interface 408, a second interface 410 and a third interface 412. The first interface 408 can be a wireless interface and be used to establish a communication connection 436 to the virtual display unit 430. A suitable transmission protocol for generating a scene (a plurality of stereotype elements (in an image) can also be called a scene) at high speed can be used for that communication connection 436. When a scene has been designed, only a list with the names of the stereotype elements used and their properties needs to be transferred (the instruction data). In addition, feedback can be transmitted back to processing system 402, if necessary or required. Also, further virtual display units assigned to further users 434 could be connected within, e.g., a cloud or holo-cloud 435. Such further users could be located in different rooms or even different countries. In some embodiments, the invention allows the use of the virtual image independently from the location of the user. By means of example, any commands, instructions, gestures, feedback and the like to be transmitted via communication connection 436 is indicated by 438. 438 can include the instruction data.

The second interface 410 can be used to connect to the storage unit or database 440 in order to obtain stereotype elements. Database 440 is a main database for stereotype elements and might constantly be expanded to include multidimensional stereotype elements, optionally as vector graphics. In general, database 440 might include all stereotype elements available. Further, database 440 might be instructed, via second interface 410, to generate a partial database 442.

Such partial database 442 might include part of the stereotype elements of database 440. The AI model used in the processing system 402 can include fully trained CNNs which comprise an output vector. The elements of the output vector are labels or identifiers that allow exact identification of stereotype elements. As soon as an AI model has been loaded into the processing system 402, it is clear which stereotype elements are required for use. These can then—as content of the partial database 442—be loaded onto the processing system 402 and also to the virtual display unit 430.

The databases include a variety of stereotype elements as (data) sets, each identified by a unique label. Each stereotype elements in a database is an object with properties (e.g., a vector graphic, having properties) that are used to represent it in a virtual image or environment (also called scene). A database can include 2D, 3D or nD stereotype elements, or mixtures of stereotype elements of different dimensions. The elements of a database, i.e., the stereotype elements, can include a unique label. This allows classification of a certain object class (identified by its label) with a certain probability. If neural network (CNN and/or RNN) comes to the conclusion that a certain object is a nucleus of a cell with a probability of 90%, then the element "cell nucleus" of the output vector of the CNN is assigned the corresponding label "cell nucleus" in the database. After the object has been classified, the position and size of the object in the image is determined and then a command to create the 3D cell nucleus—the stereotype elements—is sent to the virtual display unit, together with its position and size and other properties. Examples of stereotype elements with respect to imaging biological samples or cells, are cell nuclei, cell membranes, centrioles, mitochondria and the like (see also FIG. 3b).

The third interface 412 can be used to obtain the initial image data from, e.g., the imaging system or microscope 420. Also, such initial image data might be obtained from other data storages connected to the third interface 412.

The scene manager 460 mentioned before, is used for creating the scene (see scene 152 in FIG. 2) using stereotype elements and their positions, sizes and the like. This scene then also corresponds to the virtual image which will then be created from the instruction data. A plurality of stereotype elements (in an image) can also be called a scene. To put it casually, the scene manager 460 creates an overall picture from individual parts.

Since the virtual image (or the scene) might be changed by rearranging and/or adding and/or deleting stereotype elements, the scene manager should ensure that the scene is reassessed and adapted at all times. This results in a kind of animation of the superimposed stereotype elements, such that the user (viewer) is provided with a dynamically changing scene, as mentioned with respect to FIGS. 3a and 3b.

In order to modify a scene using the scene manager, only simple, short commands might be necessary. Since a virtual display unit, e.g. VR glasses, already contain the database (with stereotype elements), only commands with an identifier of a stereotype elements (this can be part of the instruction data mentioned earlier) are necessary in order to change a scene. The identifier of a generated object, which is derived from the database, uniquely describes the object. In this way, the scene manager 460 can quickly change the displayed scene with just a few short commands; no large amounts of data are required to display and change the images in the VR glasses or on other devices.

The (digital) lab-book 470 can be used to record experiment data (e.g. settings) and metadata. Metadata include, e.g., information that goes beyond the experiment settings, for example, that the sample is a snail that is 12 weeks old. These data can be used to suggest a suitable AI model and to select it for download as mentioned before.

To sum up, the system 400 can be used to provide a user 432, having a VR headset (or VR glasses) or the like, with a virtual image or scene of a sample currently being imaged or scanned by means of a microscope, wherein the virtual image in the beginning is kind of a rough estimation of the real sample and evolves to become a more detailed representation of the sample over time. In case any parameter of the microscope is changed—be it automatically or on request of the user—also the virtual image will change and newly evolve.

Figure 5A:
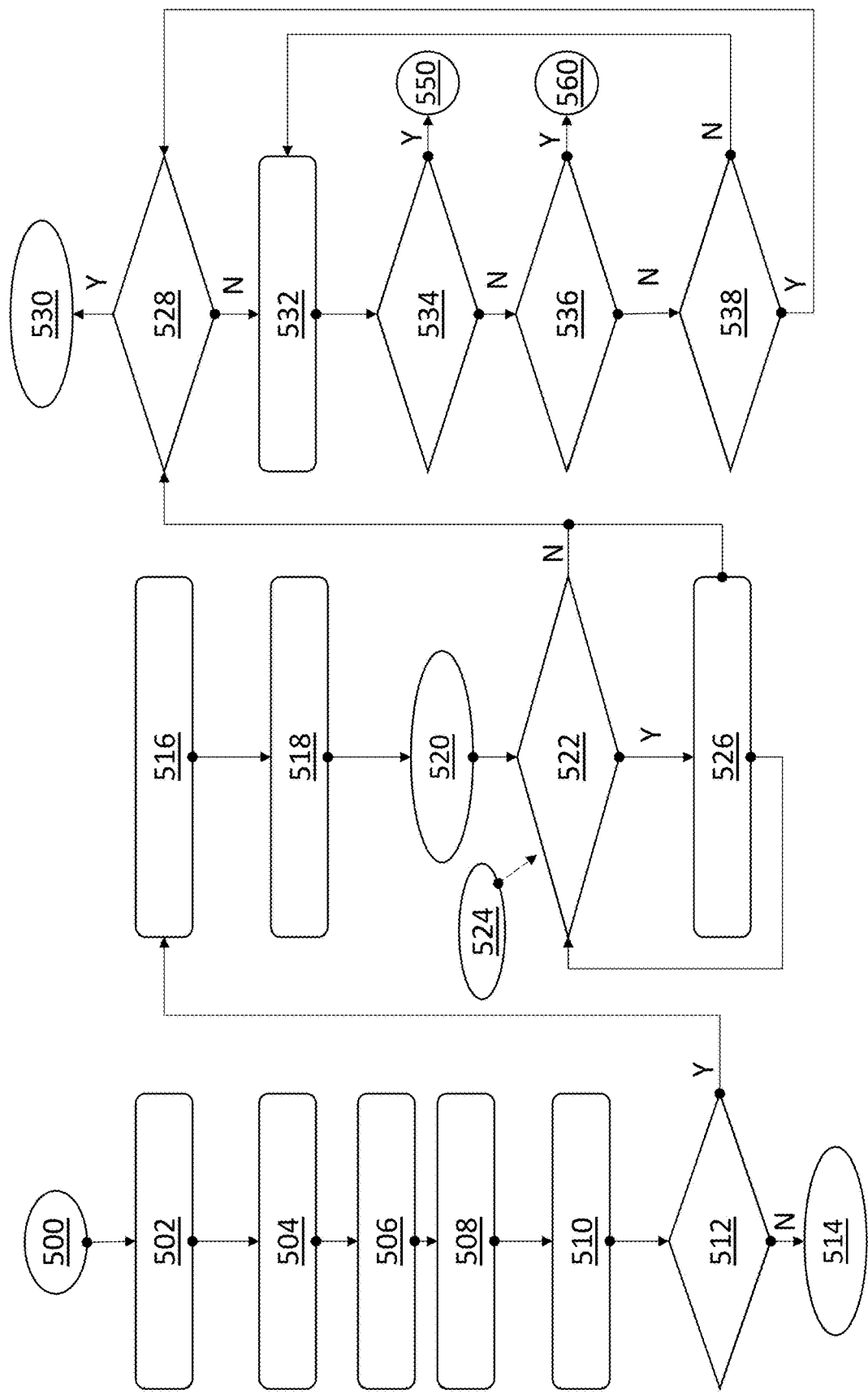
FIGS. 5a and 5b show, schematically, a method according to an embodiment of the invention in a flow diagram.
Figure 5B:
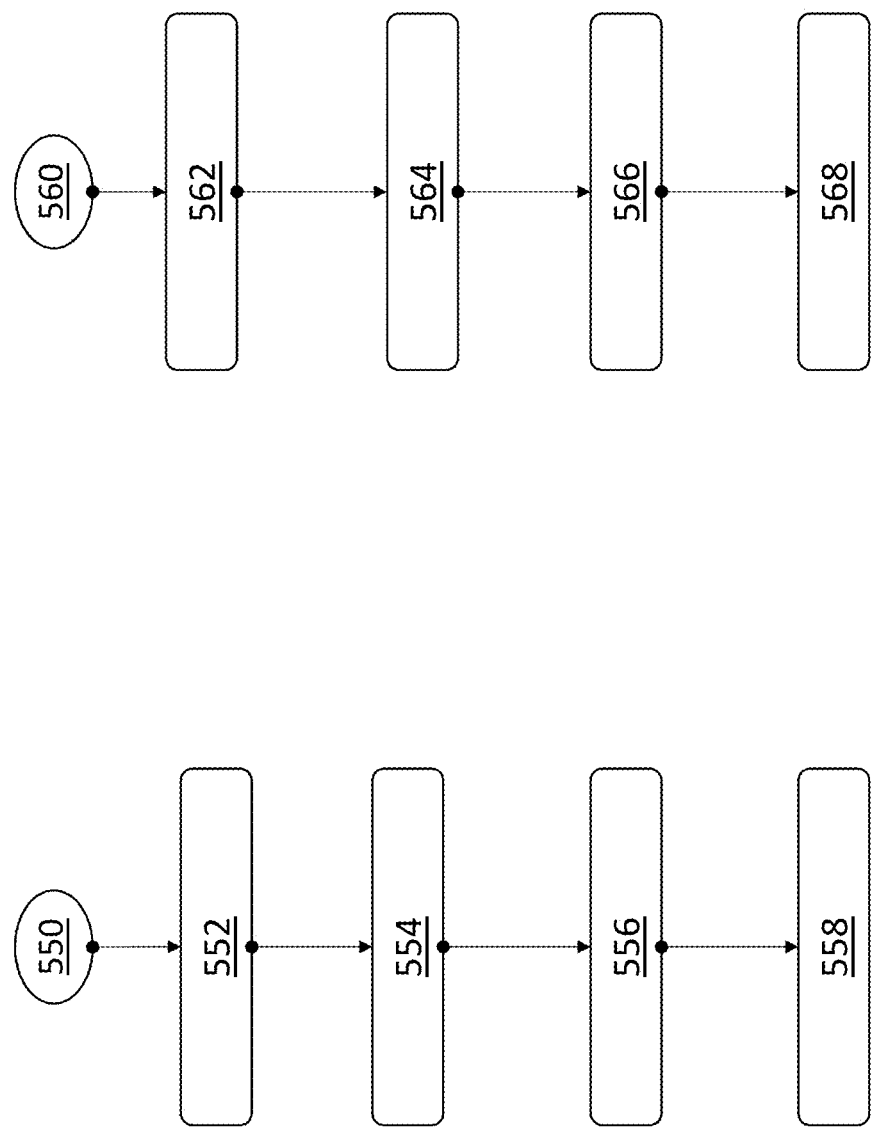

In FIGS. 5a and 5b a method according to an embodiment of the is shown in a flow diagram. After start 500, step 502 comprises initialising of the system with its data sources like the microscope, AI-units, databases and the like. Then, in step 504, relevant components like databases, visual display units and, optionally, the holo-cloud (see FIG. 4) are contacted and connected. In step 506, the experiment can be started. This includes, in step 508, opening the lab-book and obtaining all (relevant) experiment and metadata. In step 510, suitable AI models to be used are proposed. Proposed AI-models might be generated by interaction between the database (including the stereotype elements) and available AI-models. In step 512 it is checked, whether a suitable AI-model has been found to be proposed. If not, the experiment is stopped in step 514 and further AI-models have to be trained.

If, however, one or more suitable AI-models are found, they are downloaded or inferred, in step 516, to the processing system. Further, in step 518, partial databases are downloaded to all relevant components like the processing system and the visual display unit(s). The partial databases can be based on the AI-model and/or the lab-book, for example. Then, in step 520, the next step of the experiment starts with imaging the sample, e.g., layer by layer.

The method might include in step 522, optionally, checking whether any changes to the sample or microscope occur (e.g., by receiving any feedback 524). It this is the case, corresponding changes to the imaging process or the like can be made in step 526. Steps 522 and 526 may continuously be repeated.

If there is no change necessary, it is checked in step 528, whether imaging is completed. If so, the experiment might be finished or it might be waited for any further stop criterion in step 530. If the imaging process has not yet finished, step 532 with imaging and analysing image data follows. This includes a check 534 as to whether an object is recognized and identified or classified. If yes, step 550 follows. If not, a check 536 follows as to whether the recognized object has not been classified. If yes, step 560 follows. If not, it is checked, in step 538, whether the image or a layer of the image has been imaged completely. If not, step 532 begins again, if yes, step 528 follows.

Steps 550 and 560 are expanded in FIG. 5b. According to step 550 objects are recognized and classified. This means, in step 552, that a probability for each classified object is determined by the artificial neural network as to what the object is. A high probability value indicates that the object was correctly identified. In step 554, metadata like position, size and further features of the object are determined or identified. In step 556, the scene manager is used to add for every classified object a unique identifier for a stereotype element to the instruction data (it can be a list). According to the metadata, position and size and the like can be adjusted for each stereotype element. In step 558, these instruction data are sent to the visual display unit. Within the visual display unit, a scene or virtual image can be generated according to the received instruction data.

According to step 560 objects are recognized but not classified. This means, in step 562, that a probability for each classified object is determined by the artificial neural network such that no object can be considered identified. For example, there is a probability of about 50% for two different objects that might have been recognized. In step 564, metadata like position, size and further features of the (not classified) objects are determined or identified. In step 566, the scene manager is used to add for every object that has not been classified an identifier for a placeholder stereotype element (e.g., a plain sphere) to the instruction data. According to the metadata, position and size and the like can be adjusted for each stereotype element. In step 568, these instruction data are sent to the visual display unit. Within the visual display unit, a scene or virtual image can be generated according to the received instruction data.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some embodiments relate to a microscope comprising a system as described in connection with one or more of the FIGS. 1 to 5b. In some embodiments, a microscope may be part of or connected to a system as described in connection with one or more of the FIGS. 1 to 5b. FIG. 4 shows a schematic illustration of a system 400 configured to perform a method described herein. The system 400 comprises a microscope 420 and a processing system 402, being a computer system. The microscope 420 is configured to take images and is connected to the processing system 402. The image processing unit 402 is configured to execute at least a part of a method described herein. The processing system 402 may be configured to execute a machine learning algorithm. The processing system 402 and microscope 420 may be separate entities but can also be integrated together in one common housing. The processing system 402 may be part of a central processing system of the microscope 420 and/or the processing system 402 may be part of a subcomponent of the microscope 420, such as a sensor, an actor, a camera or an illumination unit, etc. of the microscope 420.

The processing system 402 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The processing system 402 may comprise any circuit or combination of circuits. In one embodiment, the processing system 402 may include one or more processors which can be of any type. As used herein, processor may mean any type (e.g., SOC) of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the processing system 402 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The processing system 402 may include one or more storage devices, which may include one or more memory elements suitable to the application, such as a main memory in the form of random access memory (RAM), one or more hard drives, and/or one or more drives that handle removable media such as compact disks (CD), flash memory cards, digital video disk (DVD), and the like. The processing system 402 may also include a display device, one or more speakers, and a keyboard and/or controller, which can include a mouse, trackball, touch screen, voice-recognition device, or any other device that permits a system user to input information into and receive information from the processing system 402.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware and/or in software. The implementation can be performed using a non-transitory storage medium such as a digital storage medium, for example an HDD, an SSD, a floppy disc, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

In an embodiment of the present invention, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. An embodiment of the present invention is an apparatus as described herein comprising a processor and the storage medium.

An embodiment of the invention is, therefore, a data stream or a sequence of signals representing the computer program for performing one of the methods described herein. The data stream or the sequence of signals may, for example, be configured to be transferred via a data communication connection, for example, via the internet.

An embodiment comprises a processing means, for example, a computer or a programmable logic device, configured to, or adapted to, perform one of the methods described herein.

An embodiment comprises a computer having installed thereon the computer program for performing one of the methods described herein.

An embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

Embodiments may be based on using a machine-learning model or machine-learning algorithm. Machine learning may refer to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analysed using a machine-learning model or using a machine-learning algorithm. In order for the machine-learning model to analyse the content of an image, the machine-learning model may be trained using training images as input and training content information as output. By training the machine-learning model with a large number of training images and/or training sequences (e.g. words or sentences) and associated training content information (e.g. labels or annotations), the machine-learning model "learns" to recognize the content of the images, so the content of images that are not included in the training data can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. The provided data (e.g. sensor data, metadata and/or image data) may be preprocessed to obtain a feature vector, which is used as input to the machine-learning model.

Machine-learning models may be trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g. a classification algorithm, a regression algorithm or a similarity learning algorithm. Classification algorithms may be used when the outputs are restricted to a limited set of values (categorical variables), i.e. the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine-learning model. In unsupervised learning, (only) input data might be supplied and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

Furthermore, some techniques may be applied to some of the machine-learning algorithms. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a pre-processing step before performing classification or predictions. Feature learning may be based on principal components analysis or cluster analysis, for example.

In some examples, anomaly detection (i.e. outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In some examples, the machine-learning algorithm may use a decision tree as a predictive model. In other words, the machine-learning model may be based on a decision tree. In a decision tree, observations about an item (e.g. a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate or apply the knowledge.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge (e.g. based on the training performed by the machine-learning algorithm). In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g. of the sum of its inputs). The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

In some embodiments, the machine-learning model may be a support vector machine, a random forest model or a gradient boosting model. Support vector machines (i.e. support vector networks) are supervised learning models with associated learning algorithms that may be used to analyse data (e.g. in classification or regression analysis). Support vector machines may be trained by providing an input with a plurality of training input values that belong to one of two categories. The support vector machine may be trained to assign a new input value to one of the two categories. In some embodiments, the machine-learning model may be a Bayesian network, which is a probabilistic directed acyclic graphical model. A Bayesian network may represent a set of random variables and their conditional dependencies using a directed acyclic graph. In some embodiments, the machine-learning model may be based on a genetic algorithm, which is a search algorithm and heuristic technique that mimics the process of natural selection.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for approximating image data, comprising:
obtaining initial image data formed by imaging at least part of a sample;
analysing the initial image data to form one or more portions of image data, each portion of image data representing at least part of an object within the sample;
accessing a set of predefined stereotype elements;
determining one or more of the stereotype elements as a visual approximation for the at least one object within the sample, which the at least one of the portions of image data is representing;
selecting one or more of the determined stereotype elements to be associated with at least one object within the sample, which the at least one of the portions of image data is representing; and
forming instruction data based on and/or including the one or more selected stereotype elements, the instruction data including instructions on how to arrange the one or more selected stereotype elements,
wherein the determining of the visual approximation comprises:
checking whether a probability value, defining that a stereotype element corresponds to a portion of image data or an object it represents, is within a predefined probability threshold, and,
if no stereotype element is found, for which the probability value is within the predefined probability threshold, selecting a different set of stereotype elements.

2. The method of claim 1, further comprising: transmitting the instruction data.

3. The method of claim 1, wherein the instruction data includes at least one of the following parameters for at least one selected stereotype element: an identifier, a position, a size, an orientation, and a modifier for the stereotype.

4. The method of claim 1, wherein the instruction data includes the one or more selected stereotype elements.

5. The method of claim 1, further comprising: selecting the set of predefined stereotype elements based on one or more characteristics of the initial image data or the one or more portions of image data or parts of the one or more portions of image data.

6. The method of claim 1, wherein the determining of the visual approximation is based on image classification.

7. The method of claim 1, wherein the determining of the visual approximation and/or the selecting of one or more of the identified stereotype elements is performed at least in part by machine learning methods.

8. The method of claim 1, wherein the instruction data comprises data suitable to generate an image to be displayed as at least one of a two-dimensional view, a three-dimensional view, and a temporal sequence of multiple two-dimensional or three-dimensional views.

9. The method of claim 1, further comprising: obtaining the initial image data from at least one of: an imaging system and a data storage unit.

10. The method of claim 1, wherein the analysing of initial image data includes at least one of the following methods: image segmentation, image registration, structure from motion, machine learning methods, and trained artificial neural networks.

11. The method of claim 1, further comprising determining improved instruction data having an increased level of detail compared to the instruction data.

12. The method of claim 11, wherein the improved instruction data is determined by including at least an additional part of the initial image data.

13. The method of claim 11, wherein the improved instruction data is determined by changing one or more parameter values used in the determining of the visual approximation.

14. The method of claim 11, wherein the improved instruction data is determined by obtaining additional initial image data.

15. The method of claim 1, further comprising: processing the initial image data before or within the step of analysing the initial image data, wherein the processing of the initial image data comprises at least one of: filtering of the initial image data, geometric transformation of the initial image data, and deconvolution of the initial image data.

16. The method of claim 1, wherein the forming of instruction data is performed using a scene manager, wherein the scene manager is used and/or configured to determine the instructions on how to arrange the one or more selected stereotype elements.

17. A tangible, non-transitory computer-readable medium having instructions thereon which, upon being executed by one or more hardware processors, alone or in combination, provide for execution of the method of claim 1.

18. A processing system comprising one or more processors configured for performing a method according to claim 1.

19. The processing system of claim 18, further comprising a first interface configured for connecting to a visual display unit.

20. The processing system of claim 18, further comprising a second interface configured for connecting to a storage unit which comprises the set of predefined stereotype elements.

21. The processing system unit of claim 18, further comprising a third interface configured for obtaining the initial imaging data.

22. A system, comprising:
the processing system according to claim 18; and
a visual display unit suitable for displaying, based on the instruction data, one of a two-dimensional view, a three-dimensional view, and a sequence of multiple two-dimensional or three-dimensional views.

23. The system of claim 22, wherein the visual display unit is one of: a virtual reality headset, a two-dimensional display, a three-dimensional display, a device including shutter glasses, a beamer, a three-dimensional monitor, and an augmented reality device.

24. The system of claim 22, further comprising an imaging system configured for imaging the sample.

25. The system of claim 24, wherein the imaging system includes a microscope, a stereo microscope, a scanning microscope, a widefield microscope, a fluorescence microscope, a confocal microscope, a lightsheet microscope, or an electron microscope.

* * * * *